(12) United States Patent
Dunkle et al.

(10) Patent No.: US 8,215,290 B2
(45) Date of Patent: Jul. 10, 2012

(54) MARINE CARBON CANISTER

(75) Inventors: Gary Lee Dunkle, Connersville, IN (US); Louis Thomas Frank, Connersville, IN (US)

(73) Assignee: Stant USA Corp., Connersville, IN (US)

( * ) Notice: Subject to any disclaimer, the term of this patent is extended or adjusted under 35 U.S.C. 154(b) by 156 days.

(21) Appl. No.: 12/572,405

(22) Filed: Oct. 2, 2009

(65) Prior Publication Data

US 2010/0083938 A1    Apr. 8, 2010

Related U.S. Application Data (60) Provisional application No. 61/102,778, filed on Oct. 3, 2008.

(51) Int. Cl.
*F02M 37/20* (2006.01)
*F02M 33/02* (2006.01)
(52) U.S. Cl. ............... 123/516; 123/518; 123/519
(58) Field of Classification Search ............ 123/516, 123/518, 519, 520; 96/119, 120, 122
See application file for complete search history.

(56) References Cited

U.S. PATENT DOCUMENTS

| | | | | |
|---|---|---|---|---|
| 4,117,817 A * | 10/1978 | Nishida | ........................... | 123/516 |
| 5,024,687 A * | 6/1991 | Waller | ............................. | 96/139 |
| 5,868,119 A * | 2/1999 | Endo et al. | ..................... | 123/516 |
| 6,276,387 B1 * | 8/2001 | Pachciarz et al. | ................ | 137/43 |
| 6,520,200 B1 * | 2/2003 | Lawrukovich et al. | ......... | 137/202 |
| 6,779,544 B2 * | 8/2004 | Devall | ............................. | 137/202 |
| 6,833,022 B2 * | 12/2004 | Feisthammel et al. | ............ | 95/91 |
| 6,860,285 B2 * | 3/2005 | Ehrman et al. | ................... | 137/38 |
| 7,100,580 B2 * | 9/2006 | Lin et al. | ........................ | 123/516 |
| 7,228,850 B2 | 6/2007 | King | | |
| 7,255,094 B2 | 8/2007 | King | | |
| 7,409,946 B2 | 8/2008 | King | | |
| 7,476,269 B2 | 1/2009 | Begley et al. | | |
| 7,527,044 B2 | 5/2009 | Dunkle et al. | | |
| 7,694,665 B2 * | 4/2010 | Ehrman et al. | ................. | 123/518 |
| 2003/0205272 A1 * | 11/2003 | Benjey et al. | .................. | 137/202 |
| 2007/0107702 A1 | 5/2007 | King | | |
| 2009/0139495 A1 | 6/2009 | Crawford | | |
| 2010/0095937 A1 * | 4/2010 | Hudak et al. | ................... | 123/519 |
| 2011/0220226 A1 * | 9/2011 | Devulder et al. | .............. | 137/588 |

* cited by examiner

*Primary Examiner* — Thomas Moulis
(74) *Attorney, Agent, or Firm* — Barnes & Thornburg LLP (57) ABSTRACT

A fuel tank vent system includes a carbon canister and an engine fuel system coupled to the carbon canister. Fuel vapor discharged from a fuel tank included in the engine fuel system flows during certain conditions into the carbon canister to encounter charcoal stored in the carbon canister. Hydrocarbon material associated with the discharged fuel vapor is captured by the charcoal and a stream of cleaned vapor is discharged from the carbon canister to the atmosphere.

18 Claims, 4 Drawing Sheets

MARINE CARBON CANISTER

This application claims priority under 35 U.S.C. §119(e) to U.S. Provisional Application Ser. No. 61/102,778, filed Oct. 3, 2008, which is expressly incorporated by reference herein.

BACKGROUND

The present disclosure relates to an engine fuel system, and particularly to a fuel vapor venting system for a fuel tank associated with an engine onboard a boat. More particularly, the present disclosure relates to a carbon canister in a fuel vapor venting system.

Engine fuel systems include valves associated with a fuel tank and configured to vent pressurized or displaced fuel vapor from the vapor space in the fuel tank to a separate charcoal canister. The canister is designed to capture and store hydrocarbons entrained in fuel vapors that are displaced and generated in the fuel tank so that those hydrocarbons are not discharged to the atmosphere.

SUMMARY

A fuel vapor recovery carbon canister in accordance with the present disclosure includes a shell formed to include a fuel-vapor conduit and an air-flow conduit and a carbon bed located in an interior region of the shell and exposed to fuel vapor discharged from a fuel tank and admitted into the interior region of the shell through the fuel-vapor conduit. Fuel vapor vented (under certain operating conditions) from a fuel tank included in an engine fuel system is discharged from the fuel tank by a tank vent control system and admitted into the interior region of the shell through the fuel-vapor conduit. Hydrocarbon material associated with the vented fuel vapor is captured by the carbon bed and a stream of cleaned vapor is discharged to the atmosphere through the air-flow conduit.

In illustrative embodiments, the carbon canister is used in marine applications. The canister is configured to be mounted to a canister-orientation fixture included in a boat and coupled to an engine also included in the boat. The canister is oriented to lie at an angle of about 10° with respect to a horizontal reference line to extend in a negatively sloping direction to cause any liquid fuel that might foam a liquid pool in the shell to drain from the interior region of the shell to the fuel tank through the fuel-vapor conduit.

In illustrative embodiments, the shell includes a housing, a first end cap closing a first opening formed in a right end of the housing, and a second end cap closing a second opening formed in a left end of the housing. The second end cap is formed to include the air-flow conduit. The first end cap includes a first end plate coupled to the right end of the housing and formed to include an aperture communicating with the interior region of the shell. The first end cap further includes the fuel-vapor conduit. The fuel-vapor conduit is coupled to the first end plate and aligned with the aperture formed in the first end plate to cause fuel vapor and liquid fuel to flow back and forth between the interior region of the shell and an interior region formed in the fuel tank. The fuel-vapor conduit is offset in relation to a central axis extending through the housing and the first end plate to lie generally in close proximity or along a bottom edge of the housing to promote draining of liquid fuel in any liquid pool that might develop in the interior region of the shell through the fuel-vapor conduit to the interior region of the fuel tank.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
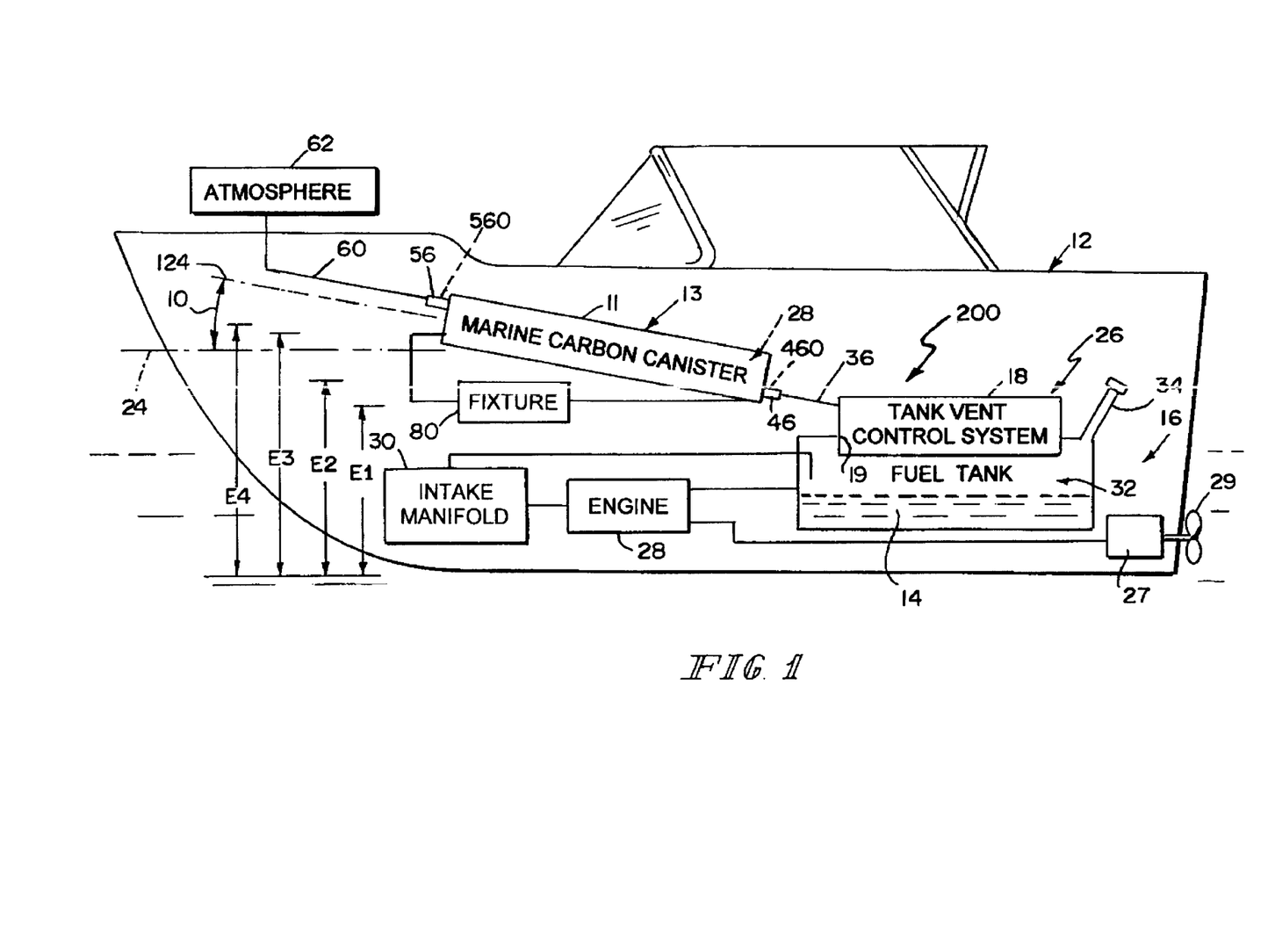
FIG. 1 is a diagrammatic view of an engine fuel system including a marine carbon canister in accordance with the present disclosure showing the canister onboard a boat and oriented along a negatively sloping line at an illustrative angle of 10° with respect to a horizontal reference line to allow any liquid fuel discharged from a companion fuel tank and extant in the canister to drain into the fuel tank through a tank vent control system (e.g., rollover valve) coupled to the fuel tank.

A carbon canister 11 in accordance with the present disclosure is mounted in an inclined stationary position in a marine vessel or boat 12 as suggested diagrammatically in FIG. 1. Should any liquid fuel 14 in fuel tank 16 flow through a faulty tank vent control system 18 into an interior region 20 formed in carbon canister 11 to form a liquid pool 22 as suggested in FIG. 6, then all such liquid fuel 14 in liquid pool 22 could later drain from carbon canister 11 into fuel tank 16 once any fault with tank vent control system 18 is corrected as suggested in FIG. 7 to cause liquid pool 22 to dissipate. In an illustrative embodiment, carbon canister 11 is oriented to lie in an inclined stationary position at an angle 10 of about 10° with respect to a horizontal reference line 24 as suggested in FIGS. 1, 6, and 7.

As suggested in FIG. 1, an engine fuel system 26 in accordance with the present disclosure comprises fuel tank 16, tank vent control system 18, and an engine 28. Engine 28 is operated using fuel 14 from fuel tank 16. Boat 12 also includes an intake manifold 30 coupled to engine 28 and to fuel tank 16. Intake manifold 30 functions to apply a vacuum to fuel tank 16 to regenerate (i.e., clean) carbon canister 11 in a customary manner. Fuel tank 16 includes a container 31 formed to include an interior region 32 containing liquid fuel 14 and a filler neck 34 coupled to container 31 and configured to conduct fuel 14 into interior region 32 during tank refueling activity. Engine 28 powers a drive unit 27 that turns a propeller 29.

In an illustrative embodiment, tank vent control system 18 comprises a rollover valve (not shown). The rollover valve is configured to provide means for opening a port 19 formed in fuel tank 16 in response to certain conditions to allow fuel vapor extant in interior region 32 of fuel tank 16 to vent through a fuel vapor-transfer conduit 36 to canister 11 and to close the port during boat rollover conditions normally to block flow of liquid fuel 14 from interior region 32 of fuel tank 16 through fuel vapor-transfer conduit 36 into interior region 20 formed in canister 11.

Figure 5:
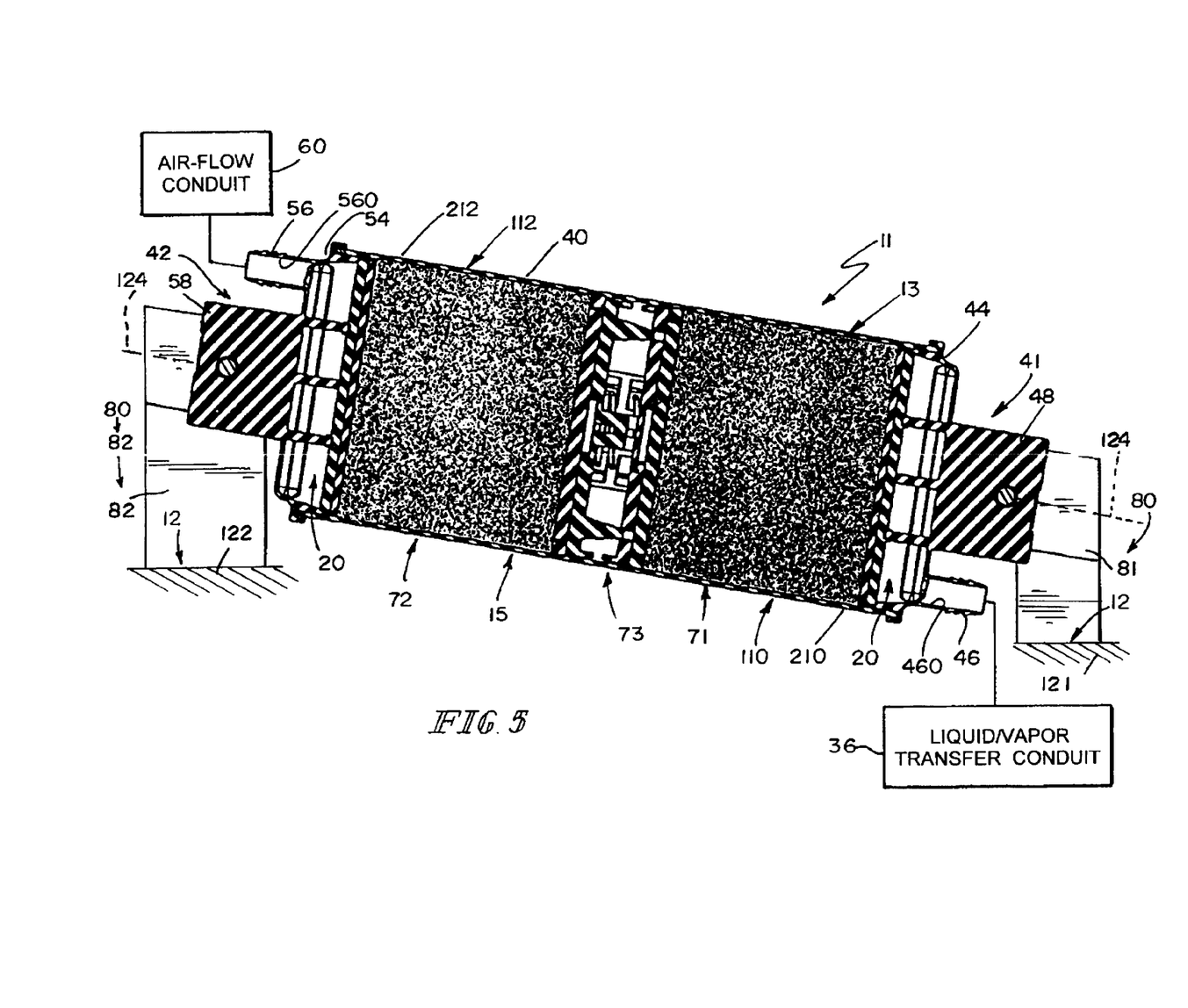
FIG. 5 is a sectional view of the canister of FIGS. 3 and 4 taken along line 5-5 of FIG. 4 after it is mounted to left and right mount fixtures included in a boat to assume an inclined self-draining position as suggested in FIGS. 1, 6, and 7.

In an illustrative embodiment, charcoal canister 11 comprises a shell 13 and charcoal 15 inside shell 13 as suggested in FIG. 5. Shell 13 includes a housing 40, a first end cap 41 on a right end of housing 40, and a second end cap 42 on a left end of housing 40 as suggested in FIGS. 2 and 3. Housing 40 and first and second end caps 41, 42 cooperate to define interior region 20 therebetween as suggested, for example, in FIG. 5. Charcoal 15 is stored in interior region 20 as shown in FIG. 5.

First end cap 41 of shell 13 includes an end plate 44 coupled to the right end of housing 40, a tubular fuel-vapor conduit 46 coupled to end plate 44 and configured to communicate with interior region 20 of canister 11 via an aperture formed in end plate 44, and a first housing-support flange 48 coupled to an exterior surface of end plate 44 as shown, for example, in FIGS. 2-5. Fuel-vapor conduit 46 is offset in first direction 51 by a distance 47 in relation to central axis 24 of canister 11 to lie generally in close proximity to or along a bottom edge 49 of housing 40 to promote draining of liquid fuel 14 in liquid pool 22 in interior region 20 of canister 11 as suggested in FIG. 7. Fuel-vapor conduit 46 is configured to mate in fluid communication with fuel vapor-transfer conduit 36 as suggested in FIGS. 1, 6, and 7.

Second end cap 42 of shell 13 includes an end plate 54 coupled to a left end of housing 40, an air-flow conduit 56 coupled to end plate 54 and configured to communicate with interior region 20 of canister 11 via an aperture formed in end plate 54, and a second housing-support flange 58 coupled to an exterior surface of end plate 54 as shown, for example, in FIGS. 2-5. Air-flow conduit 56 is offset in second direction 52 by a distance 57 in relation to central axis 24 of canister 11 to lie generally in close proximity to or along a top edge 59 of housing 40. In the illustrated embodiment, distance 57 is about equal to distance 47 as suggested in FIG. 3. Air-flow conduit 56 is coupled to an air-discharge conduit 60 arranged to communicate with atmosphere 62 as suggested in FIG. 1.

In an illustrative embodiment, charcoal 15 in canister 11 comprises a first carbon bed 71 located in interior region 20 adjacent to first end cap 41, and a second carbon bed 72 located in interior region 20 adjacent to second end cap 42. A fuel vapor/air mixing chamber 70 is provided in canister 11 and interposed between first and second carbon beds 71, 72 in interior region 20 of canister 11 as suggested in FIG. 5. Each bed 71, 72 comprises carbon granules as suggested in FIG. 5. Reference is made to U.S. Pat. No. 7,255,094, which reference is hereby incorporated by reference herein, for disclosure relating to operation of charcoal canisters generally and operation of a fuel vapor/air mixing chamber interposed between two carbon beds in particular.

Charcoal canister 11 is a fuel vapor recovery canister that contains carbon beds 71, 72 configured to capture hydrocarbon material associated with fuel vapor discharged from interior region 32 of fuel tank 16 into interior region 20 of canister 11 via tank vent control system 18, fuel vapor-transfer conduit 36, and fuel-vapor conduit 46. Periodically, a purge vacuum is generated in interior region 32 of fuel tank 16 in response to pressure and/or temperature differences in interior region 32. Negative pressure (vacuum) may develop in fuel tank 16 during tank cool down at night, for example. That purge vacuum is then applied to carbon beds 71, 72 in interior region 20 of canister 11 via tank vent control system 18, conduit 36, and conduit 46. Hydrocarbons (not shown) stored (e.g., adsorbed) on charcoal granules in charcoal beds 71, 72 are entrained into a stream of atmospheric air from atmosphere 62 drawn into canister 11 through air-discharge conduit 60 by the purge vacuum. This produces a stream of fuel vapor laden with reclaimed hydrocarbon material that is discharged from canister 11 through fuel-vapor conduit 46 and returned through tank vent control system 18 to interior region 32 of fuel tank 16.

Figure 2:
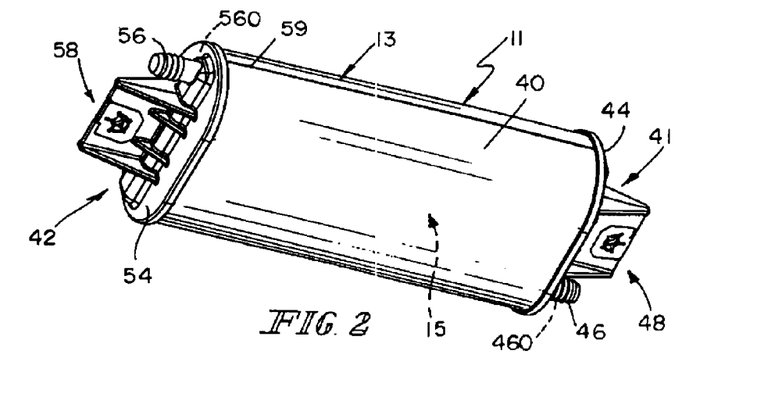
FIG. 2 is a perspective view of an illustrative fuel vapor recovery carbon canister in accordance with the present disclosure.
Figure 6:
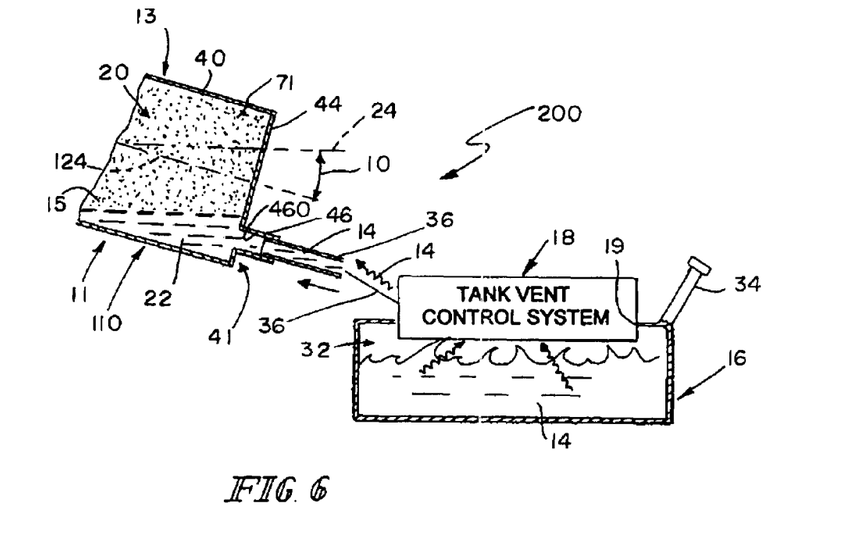
FIG. 6 is a diagrammatic view of the engine fuel system of FIG. 1 showing that some of the liquid fuel extant in the fuel tank has migrated through the tank vent control system and the fuel-vapor conduit into an interior region of the canister during an unplanned failure of the tank vent control system to block flow of liquid fuel from the fuel tank to the canister.
Figure 7:
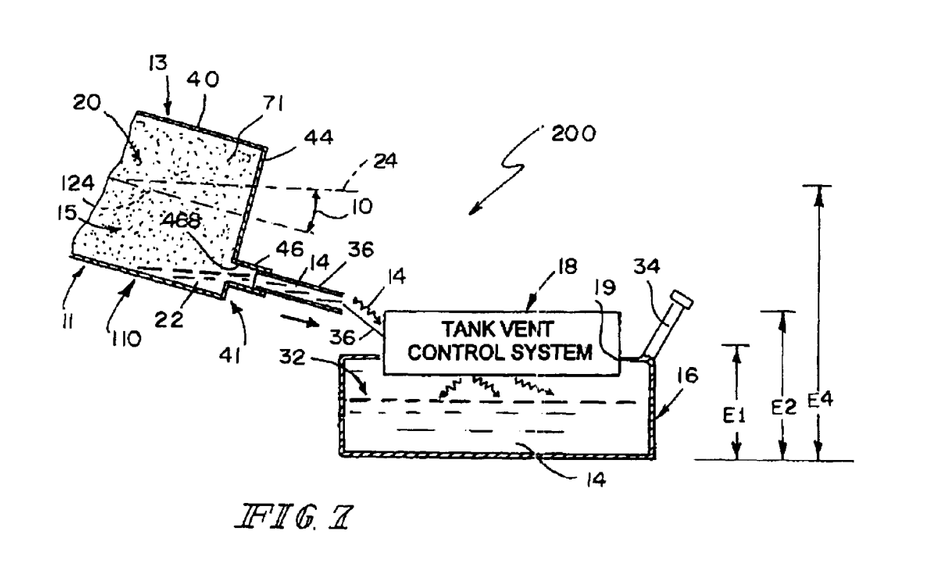
FIG. 7 is a diagrammatic view of the engine fuel system of FIG. 6 showing a self-draining capability of the canister to allow liquid fuel extant in the canister to drain into the fuel tank through the fuel-vapor conduit and the tank vent control system.

As suggested in FIGS. 1 and 2, canister 11 is fixed in an inclined stationary position in boat 12 to lie at an angle 10 of about 10° with respect to horizontal reference line 24. As such, canister 11 is oriented to lie along a negatively sloping reference line 124 to cause any liquid fuel 14 collecting in a liquid pool 22 in interior region 20 of shell 13 of canister 11 as shown in FIG. 6, later to drain from interior region 20 of canister 11 into interior region 32 of fuel tank 14 as shown in FIG. 7. In an illustrative embodiment, a right mount fixture 81 is coupled to one portion 121 of boat 12 and coupled to first housing-support flange 48 and a left mount fixture 82 is coupled to another portion 122 of boat 12 and coupled to second housing-support flange 58 to establish the inclined stationary position of canister 11 along negatively sloping reference line 124 as suggested in FIG. 5. In another embodiment (not shown), first housing-support flange 48 could be coupled to left mount fixture 82 and second housing-support flange 58 could be coupled to right mount fixture 81 to cause conduits 46, 56, to switch roles (i.e., exchange functions).

Canister 11 is suitable for marine use and is configured to be self-draining with, for example, only 10° of tilt from horizontal. There is no need to orient canister 11 in a vertical orientation (which is often difficult on a boat with vertical space limitations). Canister 11 also mounts on the end plate being on center to allow canister 11 to be mounted in either direction (switch roles of fuel-vapor conduit 46 and airflow conduit 56 by turning shell 13 180° end-on-end) or side-to-side for backing of canister 11 to accommodate large fuel tanks. Canister 11 includes air/fuel mixing chamber 70 to retain an ability to load hydrocarbons uniformly in canister 11.

A fuel tank vent system 200 includes a carbon canister 11 and a canister-orientation fixture 80 coupled to carbon canister 11 as shown, for example, in FIGS. 1 and 5. In an illustrated embodiment, canister-orientation fixture 80 includes right mount fixture 81 and left mount fixture 82 as suggested in FIG. 5. Fixture 80 is coupled, for example, to portions 121, 122 of marine vessel 12 or other suitable mobile unit as suggested in FIG. 5. Views of an illustrative carbon canister 11 are provided in FIGS. 2-4.

Carbon canister 11 is formed to include a fuel-vapor port 460 adapted to be coupled in fluid communication to an engine fuel system 26, an air-flow port 560 adapted to communicate with atmosphere 62, and in interior region 20 arranged to interconnect fuel-vapor port 460 and air-flow port 560 in fluid communication as suggested in FIG. 1. Carbon canister 11 further includes charcoal 15 stored in interior region 20 as suggested in FIG. 5 and arranged to capture and store hydrocarbons entrained in fuel vapors existing engine fuel system 26 and flowing through fuel-vapor port 460 in a direction toward air-flow port 560. Carbon canister 11 further is formed to include a central axis 124 extending therethrough along a length thereof to position fuel-vapor port 460 along a bottom portion 110 thereof below central axis 124 as suggested in FIGS. 1, 3, and 5-7.

Canister-orientation fixture 80 is coupled to carbon canister 11 as suggested in FIGS. 1 and 5. Fixture 80 is configured to establish an inclined position of carbon canister 11 to orient central axis 124 of carbon canister 11 along a negatively sloping line 124 at a predetermined acute angle 10 with respect to a horizontal reference line 24 as suggested in FIG. 1. This orientation functions to locate fuel-vapor port 460 below air-flow port 560 and most of charcoal 15 stored in interior region 20 to assume an inclined liquid fuel-draining orientation as suggested in FIGS. 1, 3, and 5-7. This orientation promotes draining of liquid fuel 14 in any liquid pool 22 that develops in interior region 20 in bottom portion 110 of carbon canister 11 and communicates with fuel-vapor port 460 from interior region 20 through fuel-vapor port 460 as suggested in FIG. 7.

Fuel tank vent system 200 further comprises an engine fuel system 26 including a fuel tank 16, a liquid/vapor transfer conduit 36 coupled in fluid communication to fuel-vapor port 460, and a tank vent control system 18 coupled in fluid communication to fuel tank 16 and to liquid/vapor transfer conduit 36 as suggested in FIGS. 1, 6, and 7. Tank vent control system 26 is configured to discharge fuel vapor generated in fuel tank 16 through fuel-vapor port 460 into interior region 20 of carbon canister 11 to reach charcoal 15 stored in interior region 20. Tank vent control system 18 is located at a first elevation E1 and fuel-vapor port 460 is located at a second elevation E2 that is higher than first elevation E1 to cause liquid fuel 14 collecting in any liquid pool 22 that develops in interior region 20 in bottom portion 110 of carbon canister 11 to flow due to forces of gravity out of interior region 20 in bottom portion 110 of carbon canister 11 and away from charcoal 15 stored in interior region 20 through liquid/vapor transfer conduit 36 and tank vent control system 18 into fuel tank 16 as suggested in FIG. 7.

Carbon canister 11 includes a housing 40 containing charcoal 15 and a first end cap 41 coupled to housing 40 as suggested in FIG. 5. First end cap 41 is formed to include fuel-vapor port 460 as suggested in FIG. 5. Housing 40 is elongated and configured to establish central axis 124 of carbon canister 11 as suggested in FIGS. 3 and 5. Housing 40 has a first (right) end coupled to first end cap 41 and an opposite second (left) end. A lowest portion of the second end is arranged to lie at a third elevation E3 that is higher than first and second elevations E1, E2 as suggested in FIG. 1.

Figures 3, 4:
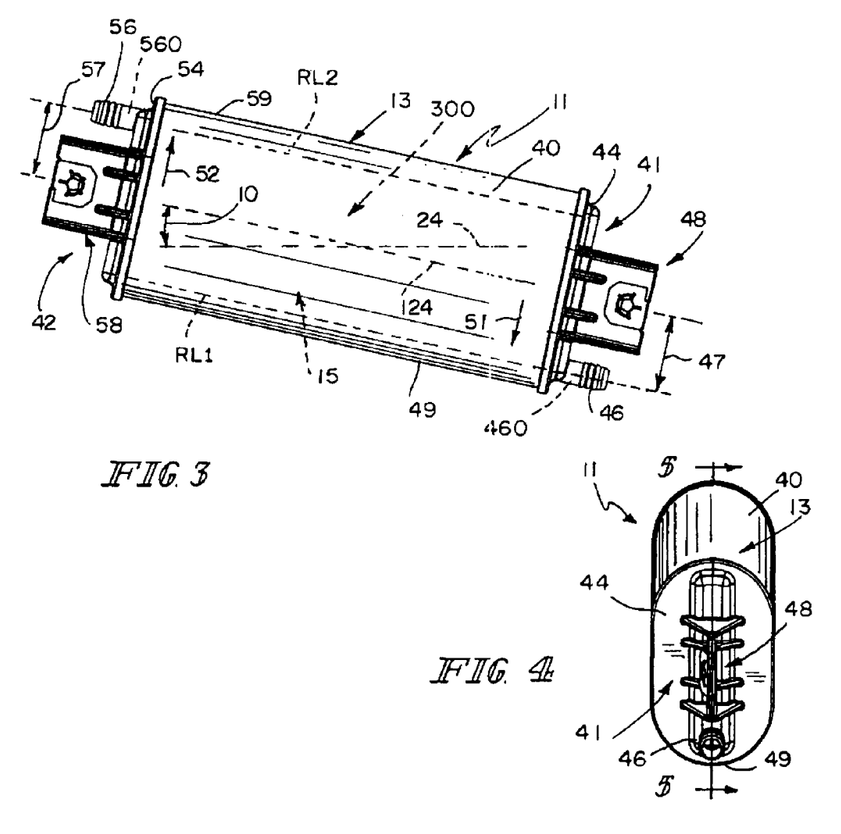
FIG. 3 is a side elevation view of the canister of FIG. 2 inclined in a negatively sloping direction at an illustrative angle of about 10° with respect to a horizontal reference line to cause a fuel-vapor conduit coupled to a right end plate of the canister and configured to conduct fuel vapor into and out of an interior region formed in the canister to assume an inclined liquid fuel-draining orientation.
FIG. 4 is an end elevation view of the right end of the canister of FIG. 3.

Air-flow port 560 is offset in an upwardly extending direction in relation to central axis 124 of housing 40 to lie in close proximity to a top edge 212 of housing 40 as suggested in FIGS. 3 and 5. Fuel-vapor port 460 is offset in an opposite downwardly extending direction in relation to central axis 124 of housing 40 to lie in close proximity to a bottom edge 210 of housing 40 as suggested in FIGS. 3 and 5. A lowest portion of top edge 212 of housing 40 is arranged to lie at a fourth elevation E4 that is higher than each of first, second, and third elevations E1, E2, E3 as suggested in FIGS. 1 and 5.

First end cap 41 includes a first end plate 44 coupled to a first end of housing 40 and a tubular fuel-vapor conduit 46 coupled to first end plate 44 and to liquid/vapor transfer conduit 36 as suggested in FIGS. 1 and 5. Tubular fuel-vapor conduit 46 is formed to include fuel-vapor port 460 and communicate with interior region 20 of carbon canister 11 via an aperture formed in first end plate 41 as suggested in FIGS. 5-7.

Housing 40 includes a second (left) end that is opposite to the first (right) end as suggested in FIG. 5. Carbon canister 11 further includes a second end cap 42 coupled to the second end. Second end cap 42 is formed to include air-flow port 560 as suggested in FIG. 5. Canister-orientation fixture 80 is also coupled to second end cap 42 to maintain carbon canister 11 in a stationary position to establish the inclined liquid fuel-draining orientation as suggested in FIGS. 1 and 5. Second end cap 42 includes a second end plate 54 coupled to the second end of housing 40 and a tubular air-flow conduit 56 coupled to second end plate 54. Tubular air-flow conduit 56 is formed to include air-flow port 560 and communicate with interior region 20 of carbon canister 11 via an aperture formed in second end plate 42.

Tubular air-flow conduit 56 is offset in an upwardly extending direction in relation to central axis 124 of carbon canister 11 to lie in close proximity to a top edge 212 of housing 40 as suggested in FIG. 5. Tubular fuel-vapor conduit 46 is offset in an opposite downwardly extending direction in relation to central axis 124 of carbon canister 11 to lie in close proximity to a bottom edge 210 of housing 40 as suggested in FIG. 5.

First end cap 41 further includes a first housing-support flange 48 coupled to an exterior surface of first end plate 44 and to canister-orientation fixture 80. Second end cap 42 further includes a second housing-support flange 58 coupled to an exterior surface of second end plate 54 and to canister-orientation fixture 80 as suggested in FIG. 5.

Tubular fuel-vapor conduit 46 is arranged to lie in spaced-apart relation to central axis 124 of carbon canister 11 and to first housing-support flange 48 as suggested in FIG. 5. Tubular air-flow conduit 56 is arranged to lie in spaced-apart relation to central axis 124 of carbon canister 11 and to second housing-support flange 58 as suggested in FIG. 5.

Tubular fuel-vapor conduit 46 extends along a first reference line RL1 as suggested in FIG. 3. Tubular air-flow conduit 56 extends along a second reference line RL2 that is arranged to lie in spaced-apart relation to the first reference line RL1 to define a central space 300 therebetween as suggested in FIG. 3. Each of first and second housing-support flanges 48, 58 is positioned to lie in the central space as suggested in FIG. 3.

The invention claimed is:
1. A fuel tank vent system comprising:
a carbon canister formed to include a fuel-vapor port adapted to be coupled in fluid communication to an engine fuel system, an air-flow port adapted to communicate with the atmosphere, and an interior region arranged to interconnect the fuel-vapor port and the air-flow port in fluid communication, the carbon canister further including charcoal stored in the interior region and arranged to capture and store hydrocarbons entrained in fuel vapors exiting the engine fuel system and flowing through the fuel-vapor port in a direction toward the air-flow port, the carbon canister further being formed to include a central axis extending therethrough along a length thereof to position the fuel-vapor port along a bottom portion thereof below the central axis:
a canister-orientation fixture coupled to the carbon canister and configured to establish an inclined position of the carbon canister to orient the central axis of the carbon canister along a negatively sloping line at a predetermined acute angle with respect to a horizontal reference line to locate the fuel-vapor port below the air-flow port and most of the charcoal stored in the interior region to assume an inclined liquid fuel-draining orientation to promote draining of liquid fuel in any liquid pool that develops in the interior region in the bottom portion of the carbon canister and communicates with the fuel-vapor port from the interior region through the fuel-vapor port:

further comprising an engine fuel system including a fuel tank, a liquid/vapor transfer conduit coupled in fluid communication to the fuel-vapor port, and a tank vent control system coupled in fluid communication to the fuel tank and to the liquid/vapor transfer conduit and configured to discharge fuel vapor generated in the fuel tank through the fuel-vapor port into the interior region of the carbon canister to reach charcoal stored in the interior region and wherein the tank vent control system is located at a first elevation and the fuel-vapor port is located at a second elevation that is higher than the first elevation to cause liquid fuel collecting in any liquid pool that develops in the interior region in the bottom portion of the carbon canister to flow due to forces of gravity out of the interior region in the bottom portion of the canister and away from charcoal stored in the interior region through the liquid/vapor transfer conduit and the tank vent control system into the fuel tank:

wherein the carbon canister includes a housing containing the charcoal and a first end cap coupled to the housing and formed to include the fuel-vapor port and the housing is elongated and configured to establish the central axis of the carbon canister:

wherein the housing has a first end coupled to the first end cap and an opposite second end and a lowest portion of the second end is arranged to lie at a third elevation that is higher than the first and second elevation;

wherein the carbon canister further includes a second end cap coupled to the second end of the housing and formed to include the air-flow port; and wherein the air-flow port is offset in an upwardly extending direction in relation to the central axis of the housing to lie in close proximity to a top edge of the housing and the fuel-vapor port is offset in an opposite downwardly extending direction in relation to the central axis of the housing to lie in close proximity to a bottom edge of the housing and wherein a lowest portion of the top edge of the housing is arranged to lie at a fourth elevation that is higher than each of the first, second, and third elevations.

2. The system of claim 1, wherein the first end cap includes a first end plate coupled to a first end of the housing and a tubular fuel-vapor conduit coupled to the first end plate and to the liquid/vapor transfer conduit and formed to include the fuel-vapor port and communicate with the interior region of the carbon canister via an aperture formed in the first end plate.

3. The system of claim 2, wherein the first end cap further includes a first housing-support flange coupled to an exterior surface of the first end plate and to the canister-orientation fixture.

4. The system of claim 3, wherein the housing includes a second end that is opposite to the first end, the carbon canister further includes a second end cap coupled to the second end, the second end cap is formed to include the air-flow port, and the canister-orientation fixture is also coupled to the second end cap to maintain the carbon canister in a stationary position to establish the inclined liquid fuel-draining orientation.

5. The system of claim 4, wherein the second end cap includes a second end plate coupled to the second end of the housing and a tubular air-flow conduit coupled to the second end plate and formed to include the air-flow port and communicate with the interior region of the carbon canister via an aperture formed in the second end plate.

6. The system of claim 5, wherein the second end cap further includes a second housing-support flange coupled to an exterior surface of the first end plate and to the canister-orientation fixture.

7. A fuel tank vent system comprising:

a carbon canister formed to include a fuel-vapor port adapted to be coupled in fluid communication to an engine fuel system, an air-flow port adapted to communicate with the atmosphere, and an interior region arranged to interconnect the fuel-vapor port and the air-flow port in fluid communication, the carbon canister further including charcoal stored in the interior region and arranged to capture and store hydrocarbons entrained in fuel vapors exiting the engine fuel system and flowing through the fuel-vapor port in a direction toward the air-flow port, the carbon canister further being formed to include a central axis extending therethrough along a length thereof to position the fuel-vapor port along a bottom portion thereof below the central axis;

a canister-orientation fixture coupled to the carbon canister and configured to establish an inclined position of the carbon canister to orient the central axis of the carbon canister along a negatively sloping line at a predetermined acute angle with respect to a horizontal reference line to locate the fuel-vapor port below the air-flow port and most of the charcoal stored in the interior region to assume an inclined liquid fuel-draining orientation to promote draining of liquid fuel in any liquid pool that develops in the interior region in the bottom portion of the carbon canister and communicates with the fuel-vapor port from the interior region through the fuel-vapor port;

further comprising an engine fuel system including a fuel tank, a liquid/vapor transfer conduit coupled in fluid communication to the fuel-vapor port, and a tank vent control system coupled in fluid communication to the fuel tank and to the liquid/vapor transfer conduit and configured to discharge fuel vapor generated in the fuel tank through the fuel-vapor port into the interior region of the carbon canister to reach charcoal stored in the interior region and wherein the tank vent control system is located at a first elevation and the fuel-vapor port is located at a second elevation that is higher than the first elevation to cause liquid fuel collecting in any liquid pool that develops in the interior region in the bottom portion of the carbon canister to flow due to forces of gravity out of the interior region in the bottom portion of the canister and away from charcoal stored in the interior region through the liquid/vapor transfer conduit and the tank vent control system into the fuel tank:

wherein the carbon canister includes a housing containing the charcoal and a first end cap coupled to the housing and formed to include the fuel-vapor port and the housing is elongated and configured to establish the central axis of the carbon canister;

wherein the first end cap includes a first end plate coupled to a first end of the housing and a tubular fuel-vapor conduit coupled to the first end plate and to the liquid/vapor transfer conduit and formed to include the fuel-vapor port and communicate with the interior region of the carbon canister via an aperture formed in the first end plate;

wherein the first end cap further includes a first housing-support flange coupled to an exterior surface of the first end plate and to the canister-orientation fixture;

wherein the housing includes a second end that is opposite to the first end, the carbon canister further includes a second end cap coupled to the second end, the second end cap is formed to include the air-flow port, and the canister-orientation fixture is also coupled to the second end cap to maintain the carbon canister in a stationary position to establish the inclined liquid fuel-draining orientation;

wherein the second end cap includes a second end plate coupled to the second end of the housing and a tubular air-flow conduit coupled to the second end plate and formed to include the air-flow port and communicate with the interior region of the carbon canister via an aperture formed in the second end plate; and wherein the tubular air-flow conduit is offset in an upwardly extending direction in relation to the central axis of the carbon canister to lie in close proximity to a top edge of the housing and the tubular fuel-vapor conduit is offset in an opposite downwardly extending direction in relation to the central axis of the carbon canister to lie in close proximity to a bottom edge of the housing.

8. The system of claim 1, wherein the carbon canister includes a housing containing the charcoal and a first end cap coupled to the housing and formed to include the fuel-vapor port, the housing is elongated and configured to establish the central axis of the carbon canister, the first end cap includes a first end plate coupled to a first end of the housing and a tubular fuel-vapor conduit coupled to the first end plate and to the liquid/vapor transfer conduit and formed to include the fuel-vapor port and communicate with the interior region of the carbon canister via an aperture formed in the first end plate, and the first end cap further includes a first housing-support flange coupled to an exterior surface of the first end plate and to the canister-orientation fixture.

9. The system of claim 8, wherein the tubular fuel-vapor conduit is arranged to lie in spaced-apart relation to the central axis of the carbon canister and to the first housing-support flange.

10. The system of claim 8, wherein the housing includes a second end that is opposite to the first end, the carbon canister further includes a second end cap coupled to the second end of the housing, the second end cap is formed to include the air-flow port, and the canister-orientation fixture is also coupled to the second end cap to maintain the carbon canister in a stationary position to establish the inclined liquid fuel-draining orientation.

11. The system of claim 10, wherein the second end cap includes a second end plate coupled to the second end of the housing and a tubular air-flow conduit coupled to the second end plate and formed to include the air-flow port and communicate with the interior region of the carbon canister via an aperture formed in the second end plate.

12. The system of claim 11, wherein the second end cap further includes a second housing-support flange coupled to an exterior surface of the first end plate and to the canister-orientation fixture.

13. A fuel tank vent system comprising:
a carbon canister formed to include a fuel-vapor port adapted to be coupled in fluid communication to an engine fuel system, an air-flow port adapted to communicate with the atmosphere, and an interior region arranged to interconnect the fuel-vapor port and the air-flow port in fluid communication, the carbon canister further including charcoal stored in the interior region and arranged to capture and store hydrocarbons entrained in fuel vapors exiting the engine fuel system and flowing through the fuel-vapor port in a direction toward the air-flow port, the carbon canister further being formed to include a central axis extending therethrough along a length thereof to position the fuel-vapor port along a bottom portion thereof below the central axis;

a canister-orientation fixture coupled to the carbon canister and configured to establish an inclined position of the carbon canister to orient the central axis of the carbon canister along a negatively sloping line at a predetermined acute angle with respect to a horizontal reference line to locate the fuel-vapor port below the air-flow port and most of the charcoal stored in the interior region to assume an inclined liquid fuel-draining orientation to promote draining of liquid fuel in any liquid pool that develops in the interior region in the bottom portion of the carbon canister and communicates with the fuel-vapor port from the interior region through the fuel-vapor port;

wherein the carbon canister includes a housing containing the charcoal and a first end cap coupled to the housing and formed to include the fuel-vapor port, the housing is elongated and configured to establish the central axis of the carbon canister, the first end cap includes a first end plate coupled to a first end of the housing and a tubular fuel-vapor conduit coupled to the first end plate and to the liquid/vapor transfer conduit and formed to include the fuel-vapor port and communicate with the interior region of the carbon canister via an aperture formed in the first end plate, and the first end cap further includes a first housing-support flange coupled to an exterior surface of the first end plate and to the canister-orientation fixture:

wherein the housing includes a second end that is opposite to the first end, the carbon canister further includes a second end cap coupled to the second end of the housing, the second end cap is formed to include the air-flow port, and the canister-orientation fixture is also coupled to the second end cap to maintain the carbon canister in a stationary position to establish the inclined liquid fuel-draining orientation:

wherein the second end cap includes a second end plate coupled to the second end of the housing and a tubular air-flow conduit coupled to the second end plate and formed to include the air-flow port and communicate with the interior region of the carbon canister via an aperture formed in the second end plate; and wherein the tubular air-flow conduit is offset in an upwardly extending direction in relation to the central axis of the carbon canister to lie in close proximity to a top edge of the housing and the tubular fuel-vapor conduit is offset in an opposite downwardly extending direction in relation to the central axis of the carbon canister to lie in close proximity to a bottom edge of the housing.

14. The system of claim 13, wherein the housing includes a second end that is opposite to the first end, the carbon canister further includes a second end cap coupled to the second end of the housing, the second end cap is formed to include the air-flow port, the canister-orientation fixture is also coupled to the second end cap to maintain the carbon canister in a stationary position to establish the inclined liquid fuel-draining orientation, the second end cap includes a second end plate coupled to the second end of the housing and a tubular air-flow conduit coupled to the second end plate and formed to include the air-flow port and communicate with the interior region of the carbon canister via an aperture formed in the second end plate, and the second end cap further includes a second housing-support flange coupled to an exterior surface of the second end plate and to the canister-orientation fixture.

15. The system of claim 13, wherein the tubular fuel-vapor conduit extends along a first reference line, the tubular air-flow conduit extends along a second reference line that is arranged to lie in spaced-apart relation to the first reference line to define a central space therebetween, and each of the first and second housing-support flanges is positioned to lie in the central space.

16. A fuel tank vent system comprising:
   a carbon canister including a shell formed to include a fuel-vapor conduit and an air-flow conduit and a carbon bed located in an interior region of the shell and exposed to fuel vapor discharged from a fuel tank and admitted into the interior region of the shell through the fuel-vapor conduit;
   fixture means for orienting the carbon canister to lie at an angle of about more than 5° with respect to a horizontal reference line to extend in a negatively sloping direction to cause any liquid fuel that might form a liquid pool in the shell in communication with the fuel-vapor conduit to drain from the interior region of the shell through the fuel-vapor conduit;
   wherein the shell includes a housing and a first end cap closing a first opening formed in a right end of the housing and mating with the fixture means;
   wherein the first end cap includes a first end plate coupled to the right end of the housing and formed to include an aperture communicating with the interior region of the shell, the first end cap further includes the fuel-vapor conduit, and the fuel-vapor conduit is coupled to the first end plate and aligned with the aperture formed in the first end plate to cause fuel vapor and liquid fuel to flow therethrough into and out of the interior region of the shell; and
   wherein the fuel-vapor conduit is offset in relation to a central axis extending through the housing and the first end plate to lie about at a bottom edge of the housing to promote draining of liquid fuel in any liquid pool that might develop in the interior region of the shell through the fuel-vapor conduit to a fuel tank adapted to be coupled to the fuel-vapor conduit.

17. The system of claim 16, wherein the first end cap further includes a first housing-support flange coupled to an exterior surface of the first end plate and to the fixture means.

18. The system of claim 17, wherein the shell further includes a second end cap closing a second opening formed in a left end of the housing and the second end cap is formed to include the air-flow conduit and a second housing-support flange coupled to the fixture means.

* * * * *